(12) United States Patent
Tamura et al.

(10) Patent No.: US 7,912,477 B2
(45) Date of Patent: Mar. 22, 2011

(54) MOBILE COMMUNICATION SYSTEM FOR MATCHING RESOURCE AMOUNT OF CORE NETWORK BEARER AND RESOURCE AMOUNT OF VISITED NETWORK BEARER

(75) Inventors: Toshiyuki Tamura, Tokyo (JP); Stefan Schmid, Heidelberg (DE)

(73) Assignee: NEC Corporation, Tokyo (JP)

( * ) Notice: Subject to any disclaimer, the term of this patent is extended or adjusted under 35 U.S.C. 154(b) by 1014 days.

(21) Appl. No.: 11/734,071

(22) Filed: Apr. 11, 2007

(65) Prior Publication Data

US 2007/0249339 A1 Oct. 25, 2007

(30) Foreign Application Priority Data

Apr. 21, 2006 (JP) .................................. 2006-117760
Apr. 28, 2006 (JP) .................................. 2006-125589
Dec. 18, 2006 (JP) .................................. 2006-340082

(51) Int. Cl.
*H04W 72/00* (2009.01)
(52) U.S. Cl. ..................................... 455/452.2; 455/450
(58) Field of Classification Search ........... 455/450–454
See application file for complete search history.

(56) References Cited

U.S. PATENT DOCUMENTS

2002/0068545 A1 6/2002 Oyama et al.
2002/0151312 A1* 10/2002 Rosemarijn Bos et al. ... 455/452

FOREIGN PATENT DOCUMENTS

EP          1 250 023 A      10/2002
JP          2003-298616 A    10/2003
WO          WO 2004/012419 A  2/2004

OTHER PUBLICATIONS

"Draft ETSI TS 182006 v. 0.0.8; Telecommunications and Internet Converged Services and Protocols for Advanced Networking (TISPAN); IP Multimedia Subsystem (IMS); Stage 2 TISPAN NGN Release 1. TS.23.228 Release 6 Modified". ETSI Standards, Oct. 2005. pp. 1-31. XP014031494, Sophia Antipolis Cedex, France.
"Draft ETSI TR 1XX XXX v. 0.0.4: TISPAN; NGN Release 1 Analysis of relevant 3GPP IMS specifications for use in TISPAN_NGN Release 1 specifications" ETSI Standards, Sep. 2005. pp. 1-60, XP 014031031. Sophia Antipolis Cedex, France.
"3GPP TR 23.882 v. 1.1.0; Technical Specification Group Services and System Aspect; 3GPP System Architecture Evolution: Report on Technical options and Conclusions (Release 7)". 3RD Generation Partnership Project, Apr. 20, 2006. pp. 1-120. XP002525119.

* cited by examiner

*Primary Examiner* — Lester Kincaid
*Assistant Examiner* — Steven Lim
(74) *Attorney, Agent, or Firm* — Sughrue Mion, PLLC

(57) ABSTRACT

A visited policy controlling device decides the amount of a visited network bearer resource that is provided by a visited user plane device for an end-to-end service based on the amount of a bearer service resource requested to be used in the end-to-end service. A home policy controlling device decides the amount of a core network bearer resource that a home gateway device provides for the end-to-end service based on the amount of the bearer service resource requested to be used in the end-to-end service. Further, a home policy controlling device performs processing to match the amount of the core network bearer resource decided by itself and the amount of the visited network bearer resource decided by visited policy controlling device, if they do not match.

15 Claims, 10 Drawing Sheets

MOBILE COMMUNICATION SYSTEM FOR MATCHING RESOURCE AMOUNT OF CORE NETWORK BEARER AND RESOURCE AMOUNT OF VISITED NETWORK BEARER

This application is based upon and claims the benefit of priority from Japanese Patent Applications No. 2006-117760 filed on Apr. 21, 2006, No. 2006-340082 filed on Dec. 18, 2006, and No. 2006-125589 filed on Apr. 28, 2006 the contents of which are incorporated by references.

BACKGROUND OF THE INVENTION

1. Field of the Invention

The present invention relates to a mobile communication system.

2. Description of the Related Art

In the 3GPP ($3^{rd}$ Generation Partnership Project), LTE (Long Term Evolution) and SAE (System Architecture Evolution) have been studied. One of the important issues in that study is QoS (Quality of Service).

In studying QoS control for the entire SAE architecture of SAE/LTE mobile communication system including LTE network and SAE core network, communication over the SAE core network between a visited side and a home side needs to be taken into consideration. The communication over SAE core network is typically a roaming communication over global roaming exchange (GRX) of GSMA between VPLMN (Visited Public Land Mobile Network) at the visited side and HPLMN (Home PLMN) at the home side.

As of now, in studying QoS control of the SAE/LTE mobile communication system, QoS control of LTE network corresponding to the radio access network is focused on, but QoS of SAE core network has not been studied so much. Therefore, it is required to establish QoS control for covering over the SAE architecture including the SAE core network.

Generally, VPLMN and HPLMN are operated by different operators and a policy of each operator is applied to each PLMN, thus, the policy to be applied to the user of HPLMN and the policy to be applied to the user of VPLMN may differ from each other.

The policy of VPLMN is defined by V-PCRF (Policy and Charging Rules Function) and the policy of HPLMN is defined by V-PCRF. PCEF (V-PCEF: Policy and Charging Enforcement Function) of VPLMN complies with the policy defined by V-PCRF and PCEF of HPLMN (H-PCEF) complies with the policy defined by H-PCRF.

The end-to-end service goes over SAE core network between V-PCEF and H-PCEF. On SAE core network, a SAE CN Bearer is established between UPE (User Plane Entity), which is V-PCEF, or V-IASA (IETF Administrative Support Activity)) and IASA, which is H-PCEF, (or H-IASA). QoS control for covering the entire SAE architecture including the SAE CN Bearer is required.

The Japanese Patent Laid-Open No. 2003-298616 disclosed an example of QoS control in a mobile communication system for providing the end-to-end service by connecting two nodes (a visiting node and a control gate node) by a core network. According to that, QoS control for covering the end-to-end service become available.

The SAE/LTE mobile communication system that is studied by 3GPP adopts the SAE architecture with higher flexibility in setting or changing a policy. The control disclosed in the Japanese Patent Laid-Open No. 2003-298616, however, does not take into consideration of the system configuration of the SAE/LTE mobile communication system. Therefore, it cannot be applied easily as it is.

SUMMARY OF THE INVENTION

An object of the present invention is to provide a mobile communication system that can control a bearer resource that covers the entire architecture in a system configuration with higher flexibility of a policy.

In order to achieve the abovementioned object, the mobile communication system of the present invention is a mobile communication system in which a visited network and a home network are connected with each other via a core network, including a visited user plane device, a home gateway device, a visited policy controlling device, and a home policy controlling device.

The visited user plane device is provided on the visited network, connected with a mobile terminal, and provides a visited network bearer resource for an end-to-end service that goes through the visited network, the core network and the home network between the mobile terminal and a counterpart side device. The visited user plane device relays data of the end-to-end service by the visited network bearer resource.

The home gateway device is provided on the home network, connected with the mobile terminal via the core network and the visited user plane device on the visited network, and provides a core network bearer resource for the end-to-end service. The home gateway device relays data of the end-to-end service by the core network bearer resource.

The visited policy controlling device is provided on the visited network, and decides the amount of the visited network bearer resource that is provided by the visited user plane device for the end-to-end service based on the amount of bearer service resource required for using in the end-to-end service.

The home policy controlling device is provided on the home network and decides the amount of the core network bearer resource that is provided by the home gateway device for the end-to-end service based on the amount of the bearer service resource required for using in the end-to-end service. Further, the home policy controlling device performs processing to match the amount of the core network bearer resource decided by itself and the amount of the visited network bearer resource decided by the visited policy controlling device, if they do not match.

The above and other objects, features, and advantages of the present invention will become apparent from the following description with references to the accompanying drawings which illustrate examples of the present invention.

DETAILED DESCRIPTION OF THE PREFERRED EMBODIMENTS

Embodiments for implementing the present invention will be detailed with reference to the drawings.

Figure 1:
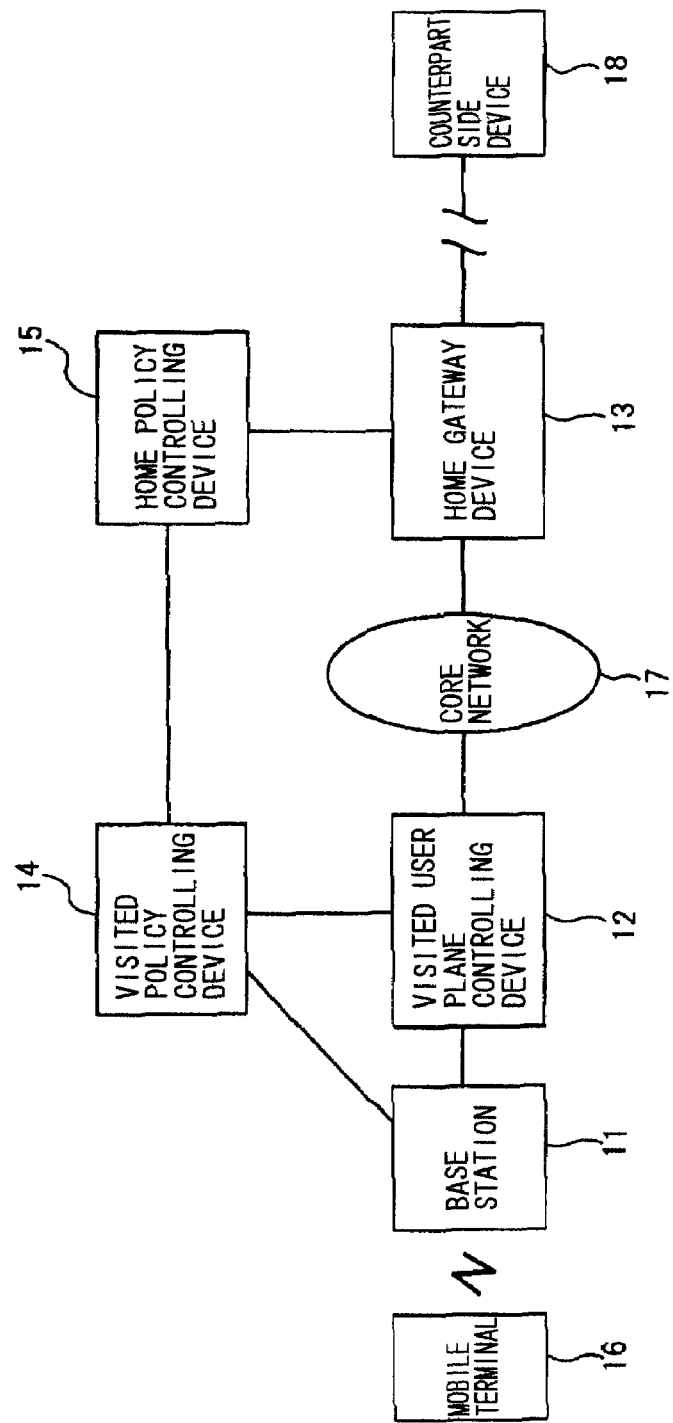
FIG. 1 is a block diagram showing a configuration of a mobile communication system according to an embodiment.

FIG. 1 is a block diagram showing a configuration of a mobile communication system according to an embodiment. Referring to FIG. 1, the mobile communication system of the embodiment has base station 11, visited user plane controlling device 12, and visited policy controlling device 14 that are belonging to a visited network, and home gateway device 13 and home policy controlling device 15 that are belonging to a home side network. Base station 11 connects with mobile terminal 16 and home gateway device 13 connects with counterpart side device 18. Visited user plane controlling device 12 and home gateway device 13 are connected with each other via core network 17. The mobile communication system of the embodiment has visited policy controlling device 14 and home policy controlling device 15 by taking consideration of a system configuration of the SAE/LTE mobile communication system.

Mobile terminal 16, base station 11, visited user plane controlling device 12, core network 17, home gateway device 13, visited policy controlling device 14 and home policy controlling device 15 belong to the SAE system.

Mobile terminal 16 is a terminal to connect with base station 11 via a radio wave, for example a cellular phone. Here, it is assumed that mobile terminal 16 and counterpart side device 18 communicate with each other in the end-to-end manner. As counterpart side device 18, other mobile terminal or a server can be assumed.

Base station 11 connects with visited user plane controlling device 12, while managing a radio bearer service resource. A typical example of a bearer service resource is a transmission band. Base station 11 connects with mobile terminal 16 via a radio wave, and provides the radio bearer service resource for the end-to-end service between mobile terminal 16 and counterpart side device 18. Then, base station 11 relays data exchanged between mobile terminal 16 and visited user plane controlling device 12 by using the radio bearer service resource provided for the end-to-end service.

Visited user plane controlling device 12 connects with home gateway device 13 via core network 17, while connecting with base station 11 for managing an access bearer service resource with base station 11. Visited user plane controlling device 12 provides the access bearer service resource for the end-to-end service between mobile terminal 16 and counterpart side device 18, and relays data exchanged between base station 11 and home gateway device 13 by using the access bearer service resource.

Home gateway device 13 connects with visited user plane controlling device 12 via core network 17 and manages a core network bearer service on core network 17, while connecting with counterpart side device 18. Home gateway device 13 provides a core network bearer service resource for the end-to-end service between mobile terminal 16 and counterpart side device 18, and relays data exchanged between visited user plane controlling device 12 and counterpart side device 18 by using the core network bearer service resource.

Visited policy controlling device 14 controls the radio bearer service resource that is provided by base station 11 for the end-to-end service, and the access bearer service resource that is provided by visited user plane controlling device 12 for the end-to-end service in conjunction with home policy controlling device 15. Here, visited policy controlling device 14 may inquire of base station 11 and visited user plane controlling device 12 about the amount of the bearer service resource, which can be provided by each of the devices.

Visited policy controlling device 14 may apply a policy defined by a visited network operator in deciding the amount of the radio bearer service resource and the amount of the access bearer service. For example, in deciding the amounts of the resources to be added, the priority of the roaming user may be set lower than the priority of the user subscribed to the visited network.

Home policy controlling device 15 controls the core network bearer service resource provided by home gateway device 13 for the end-to-end service in conjunction with visited policy controlling device 14. Here, home policy controlling device 15 may inquire of home gateway device 13 about the bearer service resource that can be provided.

Home policy controlling device 14 may apply a policy defined by an operator of the home network in deciding an amount of the core network bearer service resource.

In that case, home policy controlling device 14 calculates the amount of resource that is finally allocated for the end-to-end service (hereinafter referred to as "the amount of the allocation resource") from the amount of the bearer service resource required for the end-to-end service (hereinafter referred to as "the amount of the required resource"), the amount of the resource provided by base station 11 and visited user plane controlling device 12 (hereinafter referred to as "the amount of the visited resource") and the amount of the resource provided by home gateway device 13 (hereinafter referred to as "the amount of the home resource"). Then, visited policy controlling device 14 controls to match "the amount of the visited resource" with "the amount of the allocation resource" as required. Home policy controlling device 15 controls "the amount of the home resource" with "the amount of the allocation resource" as required.

Figure 2:
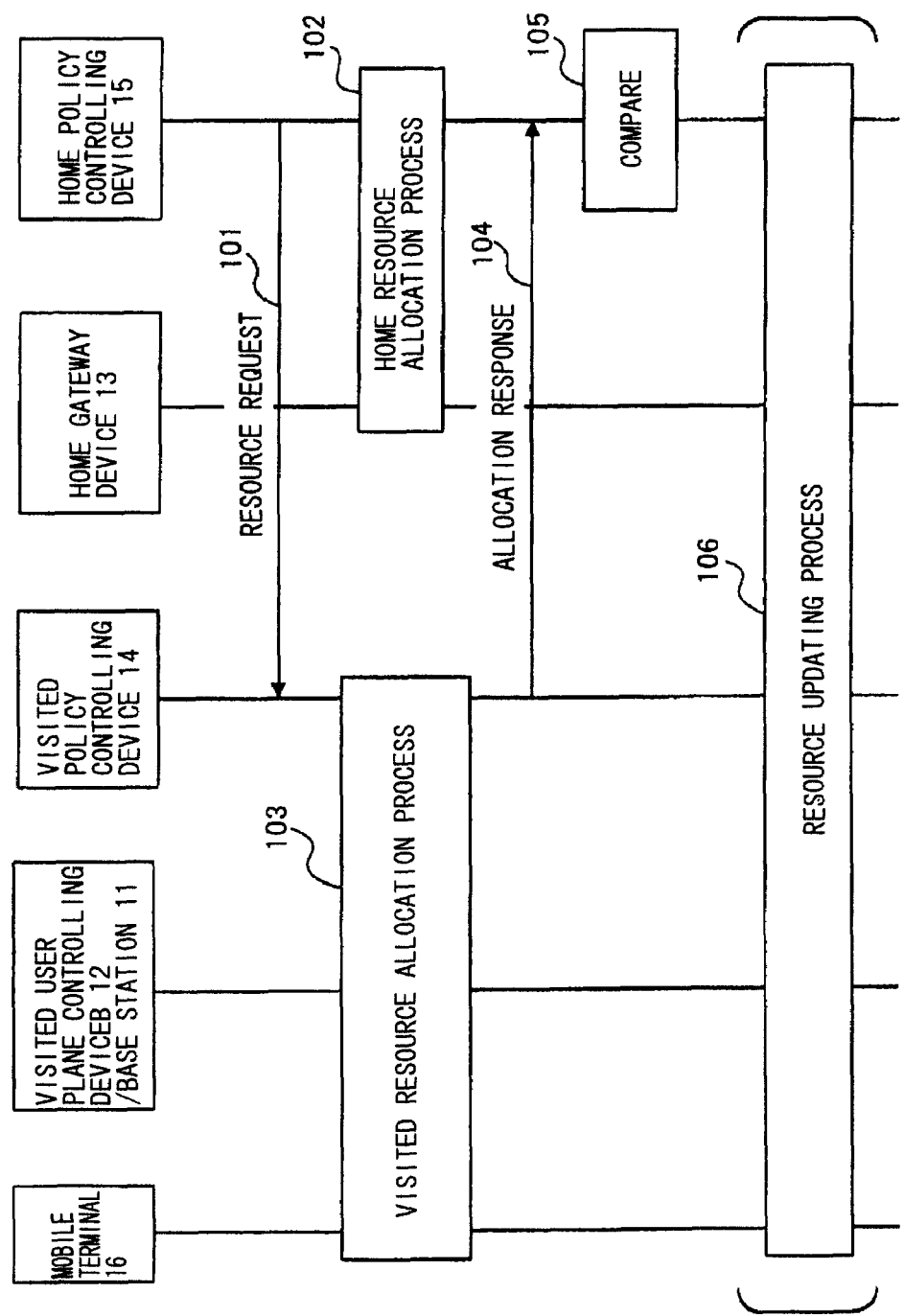
FIG. 2 is a sequence diagram showing an operation of allocating resources of the mobile communication system according to the embodiment.

FIG. 2 is a sequence diagram showing an operation of allocating resources of the mobile communication system of the embodiment. It is assumed that a request for a bearer service resource for the end-to-end service between mobile terminal 16 and counterpart side device 18 occurs. The amount of the required bearer service resource is "the amount of the required resource".

Home policy controlling device 15 may apply a policy of the home network to "the amount of the required resource". As an application manner of the home network policy, home policy controlling device 15 may change "the amount of the required resource" according to the policy of the home network. Alternatively, home policy controlling device 15 may send "the amount of the required resource" decided and added with information on the polity of the home network. In such a case, the device received "the amount of the requested resource" added with the policy of the home network only needs to apply the policy to the amount of the required resource.

As shown in FIG. 2, first, home policy controlling device 15 sends a resource request to the visited policy controlling device 14 (step 101). The resource request includes information on "the amount of the required resource".

Home policy controlling device 15 then performs home resource allocation in conjunction with home gateway device 13 (step 102). In the home resource allocation process, home policy controlling device 15 obtains the amount of the core network bearer service resource that can be provided from home gateway device 13, and decides "the amount of the home resource" that can be provided at the home side based on the information. In the embodiment, home gateway device 13 provides the core network bearer service resource of the "amount of the home resource" at the moment for the end-to-end service.

On the other hand, when visited policy controlling device 14 receives the resource request from home policy controlling device 15, it performs visited resource allocation in conjunction with visited user plane controlling device 12 and base station 11 (step 103).

Visited policy controlling device 14 may apply a policy of the visited network to "the amount of the requested resource" before the visited resource allocation process. As an application manner of the visited network policy, visited policy controlling device 14 may change "the amount of the requested resource" according to the visited network policy. Alternatively, visited policy controlling device 14 may send "the amount of the requested resource" decided and added with information on the visited network policy. In such a case, the device that receives "the amount of the requested resource" added with the visited network policy only needs to apply the policy to the amount of the requested resource.

In the visited resource allocation process, "the amount of the visited resource" is decided from the amount of the access bearer service resource that visited user plane controlling device 12 can permit and the amount of the radio bearer service resource that base station 11 can permit. In the embodiment, at that moment, visited user plane controlling device 12 provides the access bearer service resource of "the amount of the visited resource" for the end-to-end service. Base station 11 provides the radio bearer service resource of "the amount of the visited resource" for the end-to-end service.

Next, visited policy controlling device 14 sends an allocation response including information on "the amount of the visited resource" to home policy controlling device 15 (step 104).

When both "the amount of the home resource" and "the amount of the visited resource" are decided, home policy controlling device 15 compares them and decides the final "amount of the allocation resource" (step 105). If "the amount of the home resource" and "the amount of the visited resource" are the same, "the amount of the allocation resource" may also have the same amount of the resource as them. If "the amount of the home resource" and "the amount of the visited resource" are different from each other, "the amount of the allocation resource" may have the same amount of the resource as that of the less of them.

If "the amount of the home resource" and "the amount of the visited resource" are the same and "the amount of the allocation resource" with the same amount as them is decided, the mobile communication system may finish the process. However, if "the amount of the home resource" and "the amount of the visited resource" are different from each other and "the amount of the allocation resource" is decided to be the same mount as that of any one of them which is smaller in amount, it is preferable to update it so that the amount of the larger resource matches to "the amount of the allocation resource" since an extra resource is allocated to the larger one. In the embodiment, resource updating process is performed in that case (step 106).

If there is an extra in "the amount of the home resource", home policy controlling device 15 updates "the amount of the home resource" to match it with "the amount of the allocation resource" in conjunction with home gateway device 13.

If there is an extra in "the amount of the visited resource", home policy controlling device 15 instructs visited policy controlling device 14 to update "the amount of the visited resource" to match it with "the amount of the allocation resource". Visited policy controlling device 14 received the instruction updates "the amount of the visited resource" according to the instruction.

According to the embodiment, home policy controlling device 15 and visited policy controlling device 14 work in conjunction with each other to decide the amounts of the respective bearer service resources at the home side and the visited side to be provided for the end-to-end service and match the amount of the bearer service resource of the home side and the amount of the bearer service resource at the visited side so as to control a bearer resource that covers the entire architecture in the system configuration with high flexibility of the policy by separating a policy control from a user plane control.

According to the embodiment, as home policy controlling device 15 and visited policy controlling device 14 managing policies of respective operators are provided separately from base station 11, visited user plane controlling device 12 and home gateway device 13 that actually provide the bearer service resources for the end-to-end service, it has high flexibility such that it can easily set or change the policy of each operator on the entire system. For example, visited policy controlling device 14 may be adapted to distinguish a user subscribed in the self network from a roaming user to perform different QoS controls. If it gives priority to the user subscribes in the self network over the roaming user in allocating the resource, it can promote more users to subscribe to the self network.

According to the embodiment, as home policy controlling device 15 and visited policy controlling device 14 work in conjunction with each other to decide "the amount of the allocation resource" so that it matches to that of any one smaller in amount of the resource that can be provided at the home side and the resource that can be provided at the visited side, and if either of the amount at the home side or the visited side has an excess, update to eliminate the excess, so that useless allocation of resource is done to neither at the home side nor the visited side, and thus the maximum possible resource can be allocated.

Next, embodiments applied to an SAE/LTE mobile communication system that has been studied in the 3GPP will be described. A UE (User Equipment) appears in the description of each embodiment corresponds to mobile terminal 16. Both of eNodeB and LTE-RAN (Radio Access Network) correspond to base station 11. UPE, MME/UPE and V-PCEF all correspond to visited user plane controlling device 12. Both IASA and H-PCEF correspond to home gateway device 13. A peer entity corresponds to counterpart side device 18. V-PCRF corresponds to visited policy controlling device 14 and H-PCRF corresponds to home policy controlling device 15.

First Embodiment

First, in a first embodiment, important issues relating to a QoS concept and the QoS concept will be described as a premise. Next, an SAE bearer service architecture and the granularity of QoS control will be described. Further, the resource establishment and QoS signaling, and the resource establishment and QoS signaling of an SAE CN bearer will be described.

(1. Description of Key Issue QoS Concepts)

The key issue on QoS concepts encompasses the following aspects:

Means for providing enhanced QoS for services that require QoS or policies beyond what the default IP access bearer provides;

An SAE/LTE QoS profile that is simple compared to the current UMTS (Universal Mobile Telecommunication System) QoS profile (i.e. UMTS bearer service attributes).

At the same time complex mapping mechanisms between SAE/LTE QoS profile and the UMTS QoS profile are to be avoided. Multiple mappings between UMTS and SAE/LTE QoS profiles may not result in QoS changes.

Signalling of QoS profiles and signalling for Resource Establishment or Resource Reservation, including the direction of such signalling procedures (i.e. Network initiated/UE initiated);

It is also studied whether/how the current UMTS signalling model can be simplified by deriving IP bearer level and RAN level QoS and policy configuration from QoS-related signalling that is performed on application-level (e.g. IMS). This includes study of the use of per-packet QoS-related information (e.g. DSCP (Differentiated Service Code Point marking) markings).

(2. QoS Concept)

The MME/UPE/Inter AS Anchor (Access Gateway—aGW for short in this clause) will receive a PCC (Policy Control and Charging) rule including QoS request from the PCRF each time a new service is requested by the UE. If the requested QoS can not be provided by the default IP bearer/connectivity service additional SAE bearer services are required.

The aGW receives from the PCRF the details about the end-to-end services that need to be transferred, i.e. filters describing the IP flows and related QoS description (at least bit rate information and a "traffic class" representing the delay/priority requirement). The aGW may generate an aggregate for each traffic class consisting of all the end-to-end-services that are mapped to the same traffic class and their combined QoS description (at least bitrate). The eNodeB receives the aggregate QoS descriptions for each SAE bearer service. Whenever an end-to-end service is going to be started/terminated/modified, the aGW receives the relevant information, updates the aggregated QoS description and forwards it to the eNodeB.

Both, UE as well as aGW perform the mapping of the end-to-end-service IP flows to SAE bearer service(s).

In order to be able to differentiate between packets belonging to different SAE bearer services the eNodeB and the aGW needs to be aware of the aggregate QoS description of an SAE bearer. The eNodeB uses it for scheduling (DL) and policing (UL) and the aGW for policing (DL+UL).

For downlink, the nodeB treats the IP packets according to the aggregate QoS description of the SAE bearer service. For the uplink, the eNodeB polices each IP packet against the aggregate QoS description of the SAE bearer service.

(3. SAE Bearer Service Architecture)

Figure 3:
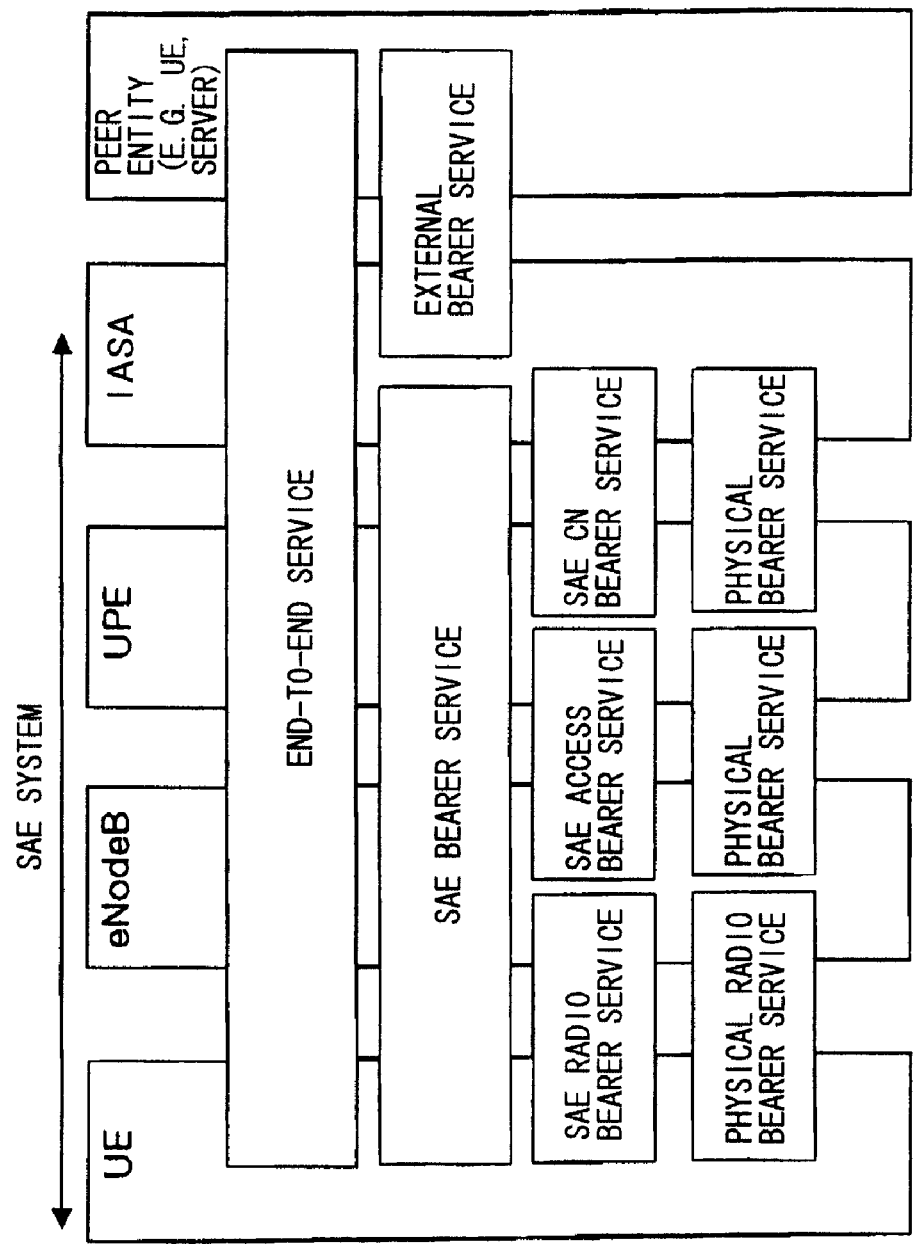
FIG. 3 is a diagram showing an SAE bearer service architecture.

FIG. 3 shows SAE Bearer Service Architecture.

The SAE bearer service layered architecture is depicted in FIG. 3. The definition of a bearer service as given in TS 23.107 is still applicable:

A bearer service includes all aspects to enable the provision of a contracted QoS. These aspects are among others the control signalling, user plane transport and QoS management functionality.

The SAE Bearer Service provides:

QoS wise aggregation of IP end-to-end-service flows;

IP header compression (and provision of related information to UE);

UP encryption (and provision of related information to UE);

if prioritised treatment of end-to-end-service signalling packets is required an additional SAE bearer service can be added to the default IP service;

provision of mapping/multiplexing information to the UE;

provision of accepted QoS information to the UE.

The SAE Radio Bearer Service provides, for example:

transport of the SAE Bearer Service data units between eNodeB and UE according to the required QoS;

linking of the SAE Radio Bearer Service to the respective SAE Bearer Service.

The SAE Access Bearer Service provides:

transport of the SAE Bearer Service data units between aGW and eNodeB according to the required QoS;

provision of aggregate QoS description of the SAE Bearer Service towards the eNodeB;

linking of the SAE Access Bearer Service to the respective SAE Bearer Service.

(4. Granularity of QoS Control)

Figure 4:
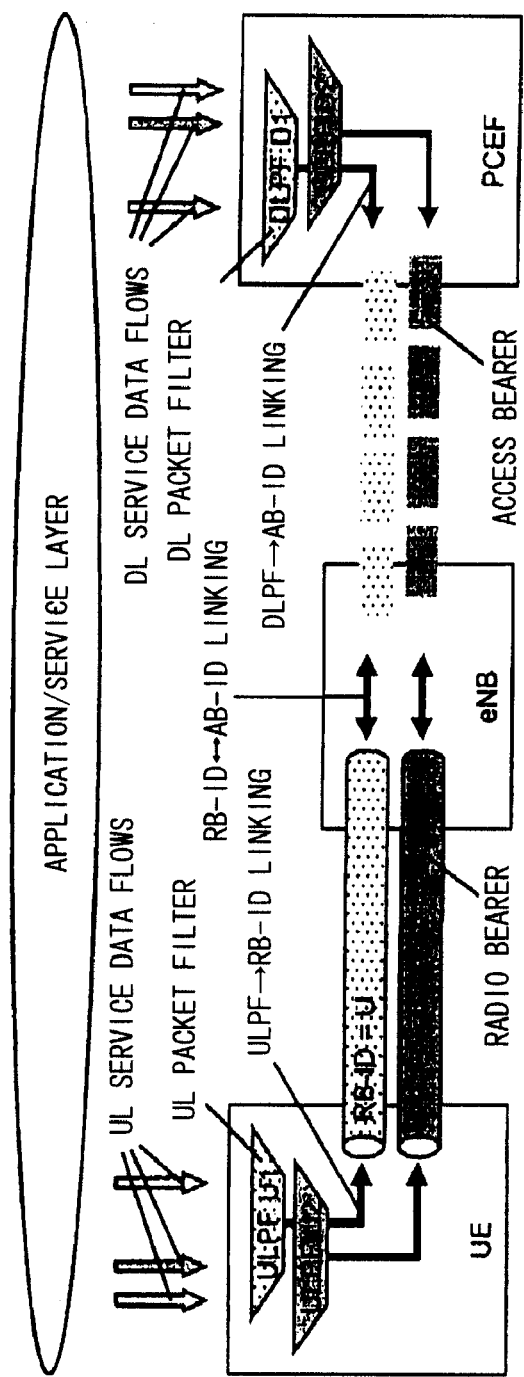
FIG. 4 is a diagram showing two Unicast SAE Bearers each consisting of one SAE Radio Bearer and one SAE Access Bearer.

FIG. 4 shows Two Unicast SAE Bearers Each Consisting of one SAE Radio Bearer and one SAE Access Bearer.

A Service Data Flow (SDF) is an aggregate set of packet flows. An UpLink Packet Filter (ULPF) in the UE binds an SDF to an SAE Bearer in the uplink direction, and a DownLink Packet Filter (DLPF) in the PCEF binds an SDF to an SAE Bearer in the downlink direction. Each unicast SAE Bearer is associated with one UE and one "traffic class".

There is a one-to-one mapping between an SAE Radio Bearer and an SAE Access Bearer.

FIG. 4 illustrates the PCEF in a way that assumes that the UPE and IASA are co-located. In case the UPE is separated from the IASA, the DLPF is located in the IASA.

An SAE Bearer (i.e., the corresponding SAE CN Bearer, SAE Radio Bearer and SAE Access Bearer) is the level of granularity for QoS control in an SAE/LTE access system. That is, SDFs mapped to the same SAE Bearer receive the same treatment (e.g., scheduling principle). Providing different QoS to two SDFs thus requires that a separate SAE Bearer is established for each SDF.

(5. Resource Establishment and QoS Signalling)

Resource Establishment and QoS Signalling handle the provisioning of QoS/policy information to the network entities that control radio/network resources. Radio/network resources are controlled applying information about the users' subscription, the UE's and the radio/network capabilities, the availability of radio/network resources, certain operator policies, and what services are being used.

It is assumed that resources can always be granted even though the requested QoS may not, i.e. the QoS can be downgraded by the network/radio. A negotiation/re-negotiation of requested network resources is possible.

Resource Establishment and QoS Signalling assume a preceding signalling of QoS requirements. This could be either by application signalling (e.g. IMS) or by IP bearer signalling. This may lead to the establishment of additional IP bearers (comparable to UMTS PS bearers). The application signalling takes place on the already established resources of the default IP access bearer. An application function performs the negotiation with the UE on media components and their characteristics and provides the relevant information to the PCRF.

For operator-controlled services (e.g. IMS) SAE/LTE supports Network-Initiated SAE Bearer establishment and Network-Initiated SAE Bearer modification, i.e., the network controls the SAE Bearer signalling and is thus responsible for requesting the appropriate bearer QoS parameters.

The Resource Establishment is triggered by a resource request from the PCRF which translates the media information into the necessary Policy/QoS information or by IP bearer signalling which contains the Policy/QoS information. In the latter case it is assumed that the network performs a QoS authorization beforehand which adds the Policy information to the bearer signalling. Activation of the resource establishment by PCRF may be supported also for non-IMS services.

The Resource Establishment function contains both, the functions that are needed to setup network and radio resources and the respective signalling towards the UE to bind the radio resources to the application layer and provide it with the authorised QoS.

The MME/UPE checks whether the granted resources correspond to the limits defined in the subscription profile of the user and initiates a resource assignment towards the radio part of the network.

The responsible LTE-RAN function checks the availability of resources and sets up the required resources and finally informs the UE on the radio resources configuration for the service and which resources are linked to which IP or session flows.

Figure 5:
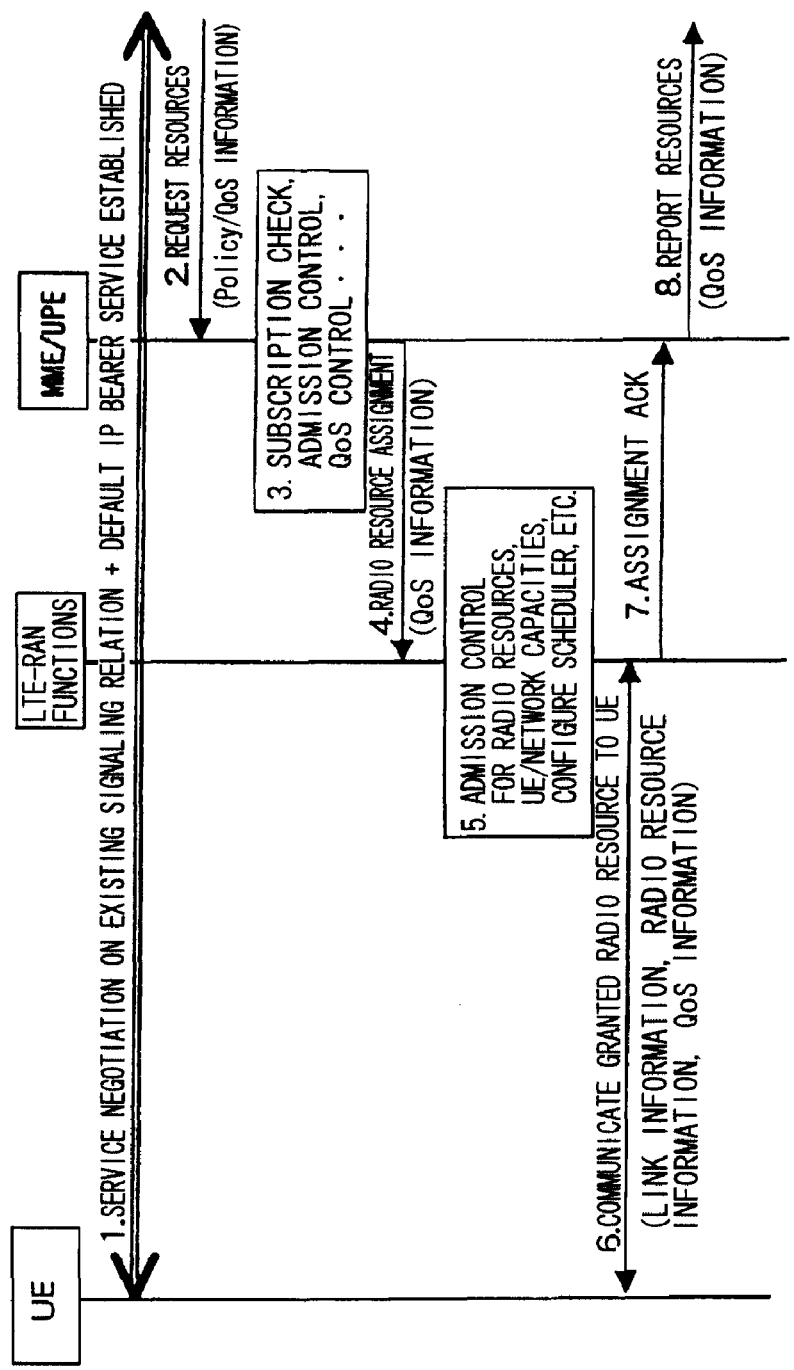
FIG. 5 is a diagram showing an information follow of resource establishment in a radio network.

FIG. 5 shows Information flow for Resource Establishment in the Radio Network.
1) The UE has a signalling relation established with the network which performs on the default IP access bearer.
2) The establishment MME/UPE is triggered by a resource request which contains Policy/QoS Information corresponding to the requested service.
3) The MME/UPE checks the UE's subscription, performs admission control according to the received QoS information and available resources and applies the received policy information. The location of the policy enforcement point might be located in the (inter-access) mobility anchor).
4) MME/UPE initiates the Resource Establishment towards the responsible LTE-RAN functions.
5) The responsible LTE-RAN functions perform admission control. Translation of the received QoS information into radio QoS information is expected to be necessary. The allocation of radio resources and the appropriate configuration of the scheduler are performed according to the translated QoS information.
6) The UE is provided with information about the radio configuration necessary for the service and related information to link radio resources with IP or session flows.
7) The MME/UPE is informed about the successful outcome of the resource establishment.
8) The MME/UPE reports the outcome of the resource establishment together with the negotiated QoS.
(6. Resource Establishment and QoS Signalling for SAE CN Bearer)

In case of a roaming UE, the SAE CN Bearer stretches from the UPE (or V-IASA) in the VPLMN (where the V-PCEF is located) to the IASA in the HPLMN (where the H-PCEF is located).

Since operator policies are applied on a per network basis, there may be different policies for a roaming user in the HPLMN and in the VPLMN. As a result, the SAE roaming architecture requires a V-PCRF function in the VPLMN that allows the visited operator to adjust the Policy/QoS information provided by the H-PCRF in the HPLMN.

The following figure shows the SAE roaming architecture with regards to policy control, charging and QoS handling for operator-controlled services, and illustrates the SAE CN bearer.

Figure 6:
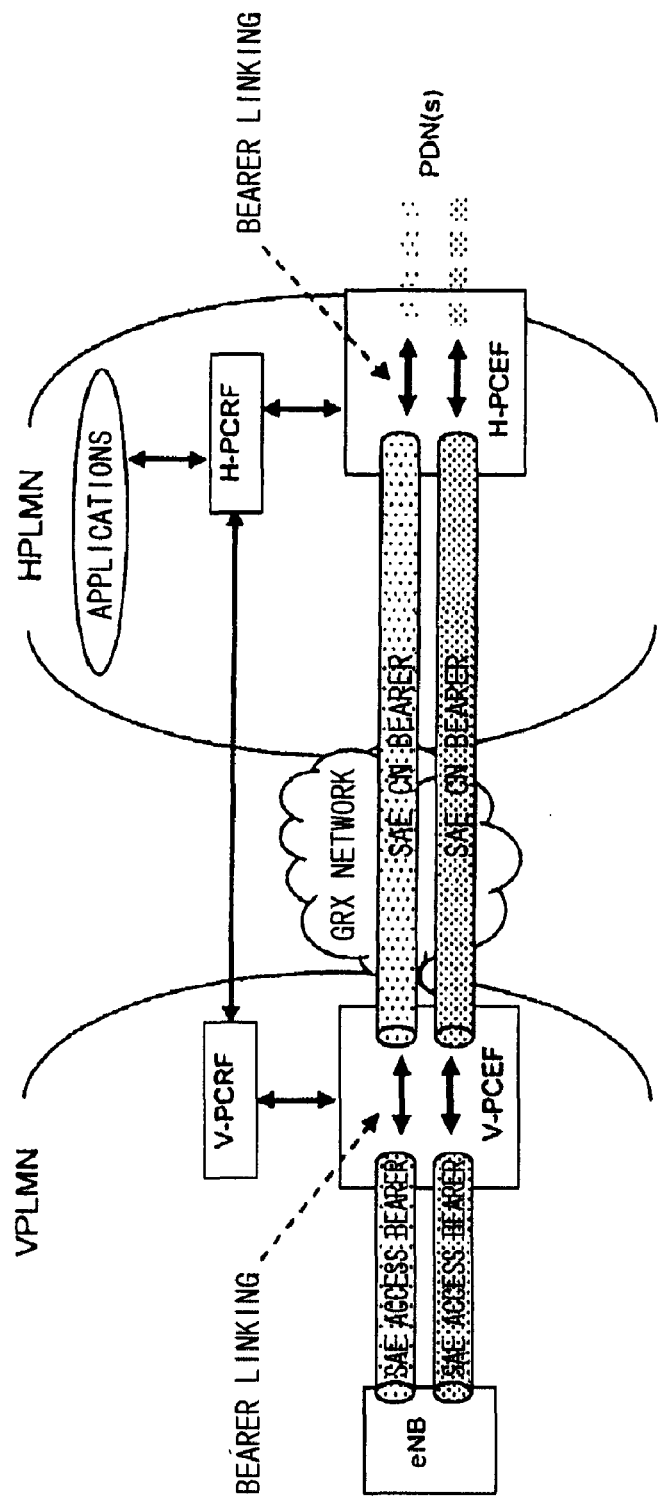
FIG. 6 is a diagram showing an SAE CN Bearer architecture for a roaming user.

FIG. 6 shows SAE CN Bearer Service Architecture for roaming user.

The Resource Establishment and QoS Signalling procedures handle the provisioning of QoS/policy information to the network entities that control the radio/network resources. Radio/network resources are controlled by applying information about the users' subscription, the UE's and the radio/network capabilities, the availability of radio/network resources, certain operator policies, and what services are being used.

Since two operator networks are involved and each network has its own PCEF, the SAE CN bearer may be adjusted in case the bearer attribution is different.

Figure 7:
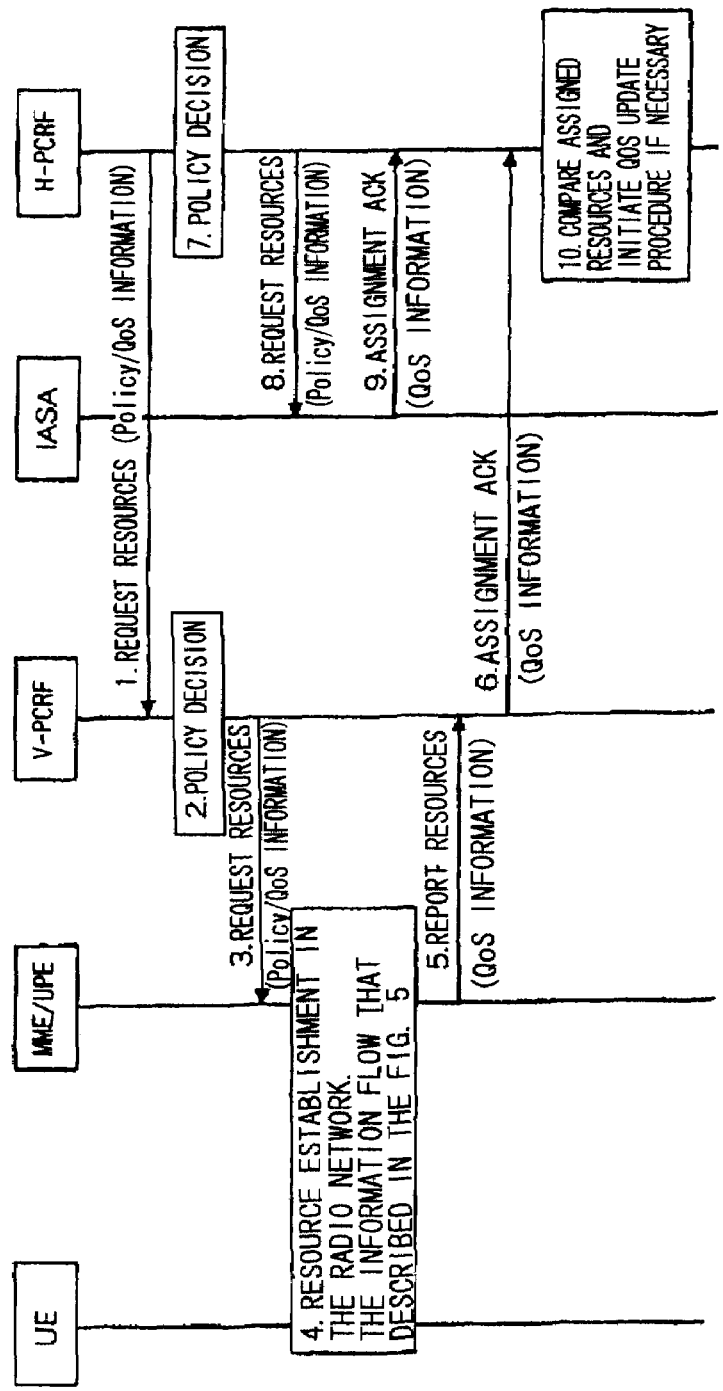
FIG. 7 is a diagram showing an information flow of resource establishment in a core network.

FIG. 7 shows Information flow for Resource Establishment in the Core Network.
1) The V-PCRF is triggered by a resource request (from the H-PCRF) that contains Policy/QoS Information corresponding to the requested service.
2) The V-PCRF makes the authorization and policy decision based on the local (visited) operator policies.
3) The V-PCRF sends the policy/QoS info to the MME/UPE.
4) MME/UPE initiates the Resource Establishment towards the responsible LTE-RAN functions. See the FIG. 7 and starts enforcing the policy/QoS (through the embedded PCEF).
5) The MME/UPE reports the outcome of the resource establishment together with the negotiated QoS to the V-PCRF.
6) The V-PCRF reports the outcome of the resource establishment together with the negotiated QoS to the H-PCRF.
7) The H-PCRF makes the authorization and policy decision based on the home operator policies (e.g., SPR).
8) The H-PCRF sends the policy/QoS info to the IASA, which starts enforcing the policy/QoS (through the embedded PCEF).
9) The IASA reports the outcome of the resource establishment together with the negotiated QoS to the H-PCRF.
10) Since step 2 through 6 and step 7 through 9 are performed in parallel, established resources are compared. If the established QoS for each bearer does not match (e.g., because the V-PCRF downgraded the requested resources due to more VPLMN policies, or the IASA is not able to grant the requested resources), then the H-PCRF initiates the QoS update procedure either toward the V-PCRF or the IASA—depending on where the QoS degradation has been happened.

The first embodiment mentioned above does not define whether the bearer establishment procedure is activated from the network side or the UE side. A trend of studying by the 3GPP on that point, the network activation is mainly studied but the need of the bearer establishment in response to the UE activation is also studied.

The default IP access bearer is established when UE first connects with the network. In such a state, a user application is not executed, thus, the PCRF is not involved in. In such a case, it is rational to set the default IP access bearer by referring to the subscription to the MME/UPE.

Alternatively, the UE may request to establish another default IP access bearer for the IASA different from that has established at the fist default IP access. Also in such a condition, the user application has not been executed, thus, the PCRF is not involved. A condition where the bearer establishing procedure in response to the UE activation is required exists as such.

Second Embodiment

In a second embodiment, an example including a bearer establishing procedure in response to a UE activation will be described.

First, in a second embodiment, important issues relating to a QoS concept and the QoS concept will be described as a premise. Next, an SAE bearer service architecture, the granularity of QoS control, and resource establishment and QoS signaling (network activation) will be described, and the resource establishment and the QoS signaling (UE activation), and an effect on a terminal used in an existing architecture will be described. The important issues on the QoS concept, the QoS concept, the SAE bearer architecture, a granularity of the QoS control, the resource establishment and the QoS signaling (network activation) are the same as those described in 1 to 5 of the first embodiment, they are omitted from the description. Among these, the second embodiment differs from the first embodiment in the SAE bearer service architecture proposed.

Figure 8:
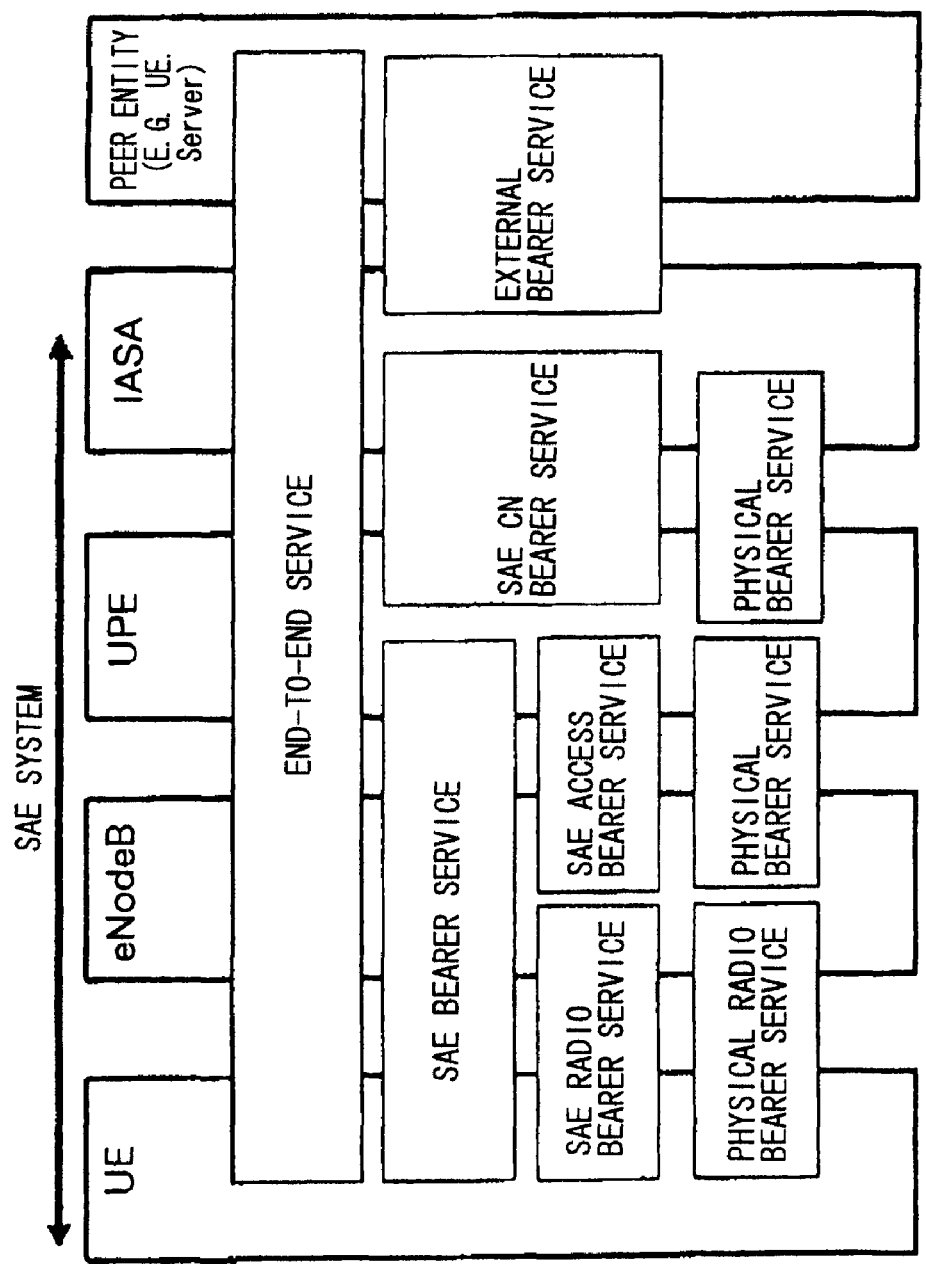
FIG. 8 is a diagram showing an SAE Bearer architecture in a second embodiment.

FIG. 8 shows the SAE bearer service architecture in the second embodiment. Referring to FIG. 8, in the second embodiment, arrangement of the SAE bearer service and the SAE CN Bearer service is different from that of the first embodiment. However, the difference is not essential one to affect any operation of each device. The difference does not result from introducing the abovementioned UE activation.

(6. Resource Establishment and QoS Signalling (UE Initiated))

The UE initiated Resource Establishment procedure is used by UE when a default IP access bearer needs to be established. This procedure is not only taken when a UE attaches to the network for the first time, but also at other times. For example, when a UE with multiple PDN access capability requests the establishment of a second default IP access bearer (toward another PDN) than the one already established for the first default IP access bearer.

The necessary QoS information for the default IP access bearer establishment is obtained by the MME/UPE to initiate this procedure.

How exactly the MME/UPE obtains this information is outside the scope of this key issue. This could be, for example, based on the subscription information exchanged between HSS and MME/UPE, or through direct signalling between the UE and the MME/UPE.

For the Resource Establishment function, the same concept as the Resource Establishment and QoS Signalling (NW initiated) apply.

Figure 9:
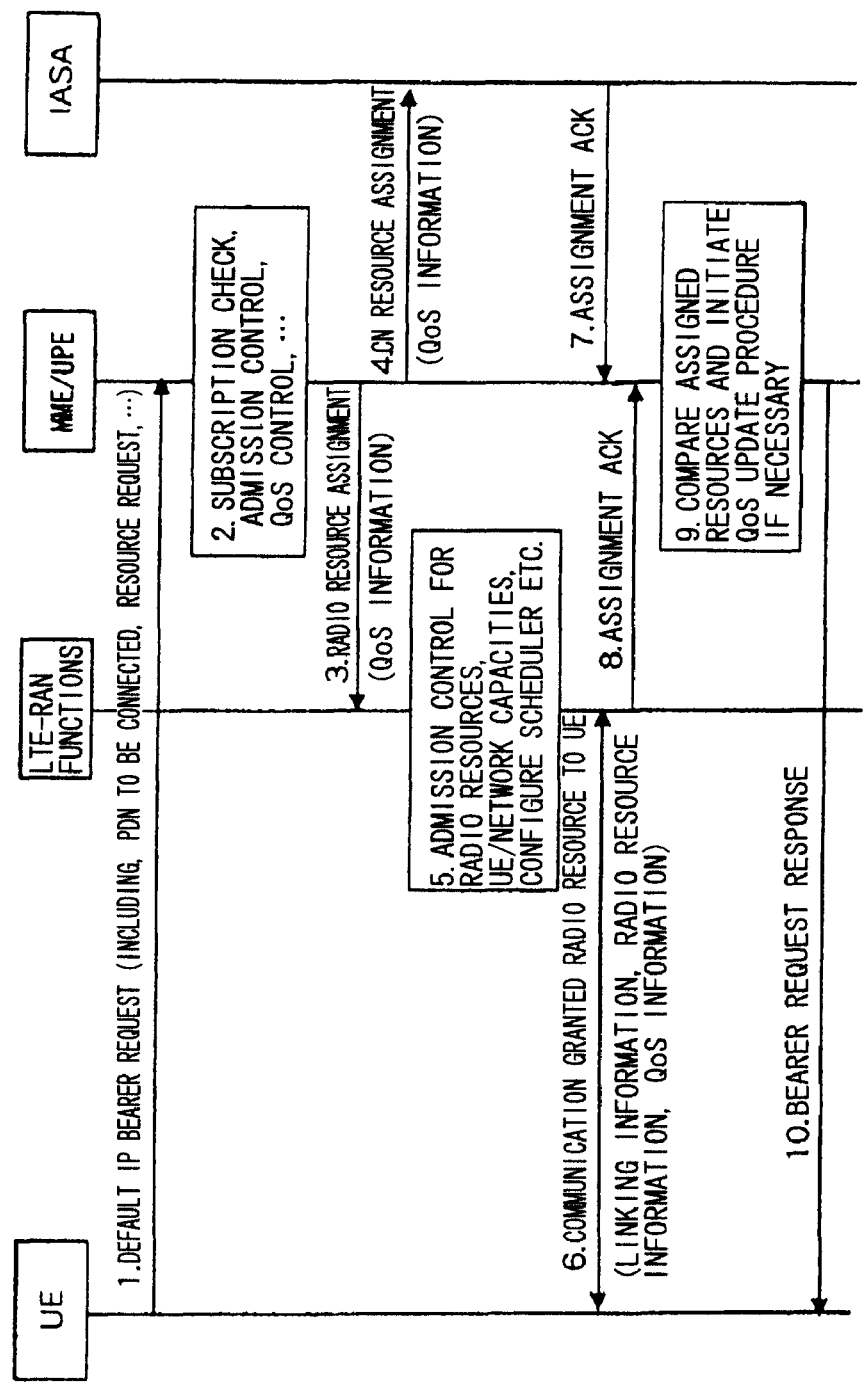
FIG. 9 is a diagram showing an information flow of a resource establishment and a QoS signaling (UE activation)

FIG. 9 shows Information flow for Resource Establishment and QoS Signaling (UE initiated).

1) The UE requests a default IP access bearer. This request includes information about the PDN the UE wants to access and possibly specific resource requirements for that IP bearer. This step is optional when the first default IP access bearer is established during the initial Network Attachment procedure, as this information can be provided as part of the "attachment request" message.
2) Based on the UE's subscription information (that the HSS provided during the Network Attachment), the MME/UPE performs admission control according to the received QoS information and available resources, and applies the received policies.
3) MME/UPE initiates the Resource Establishment towards the responsible LTE-RAN functions.
4) MME/UPE initiates the Resource Establishment towards the selected IASA for that default IP access bearer.
5) The responsible LTE-RAN functions perform admission control. Translation of the received QoS information into radio QoS information is expected to be necessary. The allocation of radio resources and the appropriate configuration of the scheduler are performed according to the translated QoS information.
6) The UE is provided with information about the radio configuration necessary for the service and related information to link radio resources with IP or session flows.
7) The MME/UPE is informed about the successful outcome of the resource establishment.
8) The MME/UPE is informed about the successful outcome of the resource establishment.
9) Since the establishment of the Access/Radio Bearer (step 3, 5, 6, 8) and the establishment of the CN Bearer (step 4, 7) are performed in parallel, the MME/UPE compares if the finally established resources for the different bearers match. In case of a discrepancy, the MME/UPE initiates a QoS update procedure either toward the LTE RAN or the IASA (depending on where the QoS degradation has happened).
10) The MME/UPE acknowledges the success of the default IP bearer establishment. As part of this message, the MME/UPE also informs the UE about the finally established resources for that IP bearer. This step is optional when the first default IP access bearer is established during the initial Network Attachment procedure, as this information can be provided as part of the "attachment accept" message.

(7. Impact on Terminals Used in the Existing Architecture)

Preferably, the UE have the capability to establish the default IP access bearer as described in the section 6.

Although an example where the UE sends the default IP bearer request to the MMN/UPE in the resource establishment procedure in response to the UE activation in the second embodiment mentioned above, other procedures are also available.

Third Embodiment

In a third embodiment, anther example of a bearer establishment procedure in response to a UE activation will be described.

Figure 10:
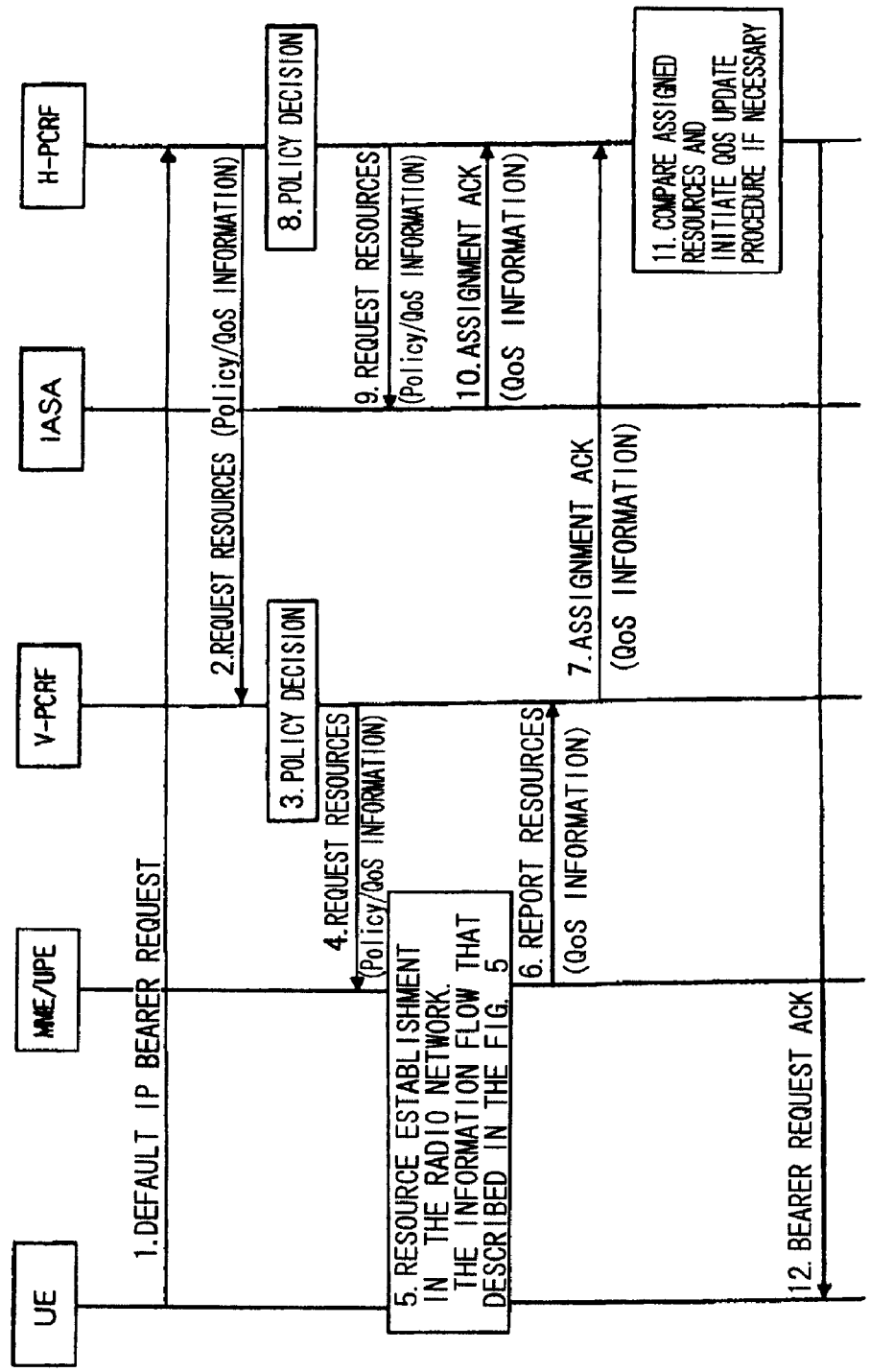
FIG. 10 is a diagram showing an information flow of the resource establishment in a core network by the UE activation.

FIG. 10 shows an information flow of resource establishment in a core network in response to the UE activation.

1) The UE requests a default IP access bearer from the H-PCRF. The request includes information relating to the PDN that the UE wants to access and may include a particular resource request of its IP bearer. As steps 2 to 11 shown in FIG. 10 are the same as steps 1 to 10 shown in FIG. 7, they are omitted from the description.
12) The H-PCRF informs the UE of the success of the default IP bearer establishment. The H-PCRF also informs UE of a resource that is finally established for its IP bearer as a part of the message.

While preferred embodiments of the present invention have been described using specific terms, such description is for illustrative purposes only, and it is to be understood that changes and variations may be made without departing from the spirit or scope of the following claims.

What is claimed is:

1. A mobile communication system in which a visited network and a home network are connected with each other via a core network, comprising:

a visited user plane device provided on the visited network, connected with a mobile terminal, providing a visited network bearer resource for an end-to-end service that goes through the visited network, the core network and the home network between the mobile terminal and a counterpart side device, and relaying data of the end-to-end service by the visited network bearer resource;

a home gateway device provided on the home network, connected with the mobile terminal via the core network and the visited user plane device on the visited network, providing a core network bearer resource for the end-to-end service, and relaying data of the end-to-end service by the core network bearer resource;

a visited policy controlling device provided on the visited network, and deciding the amount of the visited network bearer resource that is provided by the visited user plane device for the end-to-end service based on the amount of bearer service resource required for using in the end-to-end service; and a home policy controlling device provided on the home network, and deciding the amount of the core network bearer resource that is provided by the home gateway device for the end-to-end service based on the amount of the bearer service resource required for using in the end-to-end service, and performing processing to match the amount of the core network bearer resource decided by itself and the amount of the visited network bearer resource decided by the visited policy controlling device, if they do not match.

2. The mobile communication system according to claim 1, wherein the home policy controlling device applies a policy of the home network to the amount of the bearer service resource required for using in the end-to-end service and then sends a resource requesting signal including information on the required amount of resource to the visited policy controlling device, while deciding the amount of the core network bearer resource provided for the end-to-end service in conjunction with the home gateway device;

upon receiving the resource requesting signal from the home policy controlling device, the visited policy controlling device applies the policy of the visited network to information on the requested amount of resource that is included in the resource requesting signal and then decides the amount of the visited network bearer resource provided for the end-to-end service, while sending an allocation responding signal including information on the amount of the visited network bearer resource to the home policy controlling device; and upon receiving the requesting signal from the visited policy controlling device, the home policy controlling device compares the amount of the core network bearer resource decided by itself and the amount of the visited network bearer resource informed from the visited policy controlling device with the allocation responding signal, and if they do not match, makes them match.

3. The mobile communication system according to claim 2, wherein, when the home policy controlling device receives the bearer requesting signal for requesting the bearer service resource for using the end-to-end service, it starts processing of deciding the amount of the core network bearer resource to be provided for the end-to-end service and processing of causing the visited policy controlling device to decide the amount of the visited network bearer resource to be provided for the end-to-end service.

4. The mobile communication system according to claim 2, wherein the home policy controlling device sends the resource requesting signal to the visited policy controlling device, while requesting the same amount of resource as that of the resource requesting signal from the home gateway device in order to decide the amount of the core network bearer resource to be provided for the end-to-end service;

when the home gateway device is requested for the resource by the home policy controlling device, it responds to the home policy controlling device after determining the amount of the core bearer resource that can be permitted for the request;

when the visited policy controlling device receives the resource requesting signal from the home policy controlling device, it requests the amount of resource based on the request of the resource requesting signal from the visited user plane device in order to decide the amount of the visited network bearer resource to be provided for the end-to-end service; and when the visited user plane device is requested for the resource from the visited policy controlling device, it responds to the visited policy controlling device after determining the amount of the visited network bearer resource that can be permitted for the request.

5. The mobile communication system according to claim 4, wherein the visited user plane device comprises a visited user plane controlling device connected to the core network and a base station connected to the visited user plane controlling device and wirelessly connected to the mobile terminal, wherein the visited user plane controlling device manages an access bearer with the base station, and the base station manages a radio bearer with the mobile terminal;

when the visited policy controlling device receives the resource requesting signal from the home policy controlling device, it sends the visited network resource requesting signal for requesting the amount of resource based on the request by the resource requesting signal to the visited user plane controlling device;

when the visited user plane controlling device receives the visited network resource requesting signal, it determines an access bearer resource that can be permitted for the end-to-end service, while sending the wireless resource requesting signal for requesting a radio bearer resource from the base station; and when the base station receives the wireless resource requesting signal, it determines the radio bearer resource that can be permitted to the end-to-end service.

6. The mobile communication system according to claim 5, wherein when the visited user plane controlling device receives the bearer requesting signal for requesting the bearer service resource from the mobile terminal, it determines an access bearer resource that can be permitted for the request by the bearer requesting signal and sends the wireless resource requesting signal for requesting the radio bearer resource from the base station, while sending the core network resource requesting signal for requesting the core network bearer resource to the home gateway device;

when the base station receives the wireless resource requesting signal, it determines the amount of the radio bearer resource that can be permitted for the request by the wireless resource requesting signal, and sends the wireless resource allocation responding signal including information on the amount of the radio bearer resource to the visited user plane controlling device;

when the home gateway device receives the core network resource requesting signal, it sends the core network resource allocation responding signal including information on the amount of the core network bearer resource to be allocated for the request by the core network resource requesting signal to the visited user plane controlling device; and if the amount of the radio bearer resource included in the wireless resource allocation responding signal received from the base station and the amount of the core network bearer resource included in the core network resource allocation responding signal received from the home gateway device do not match, the visited user plane controlling device performs to match them.

7. The mobile communication system according to claim 1, wherein the home policy controlling device performs control so as to any bearer resource larger in amount of the core network bearer resource decided by itself and the visited network bearer resource decided by the visited policy controlling device matches to the other smaller in amount.

8. A bearer resource controlling method in a mobile communication system in which a visited network comprising a visited user plane controlling device and a visited policy controlling device and a home network comprising a home gateway device and a home policy controlling device are connected via a core network, and the visited user plane device connects with a mobile terminal, provides a visited network bearer resource for an end-to-end service that goes through the visited network, the core network and the home network between the mobile terminal and a counterpart side device, and relays data of the end-to-end service by the visited network bearer resource, and the home gateway device connects with the mobile terminal via the core network and the visited user plane device in the visited network, provides the core network bearer resource to the end-to-end service, and relays data of the end-to-end service by the core network bearer resource, comprising;

deciding, in the visited policy controlling device, the amount of the visited network bearer resource that is provided by the visited user plane device for the end-to-end service based on the amount of the bearer service resource requested to be used in the end-to-end service;

deciding, in the home policy controlling device, the amount of the core network bearer resource that is provided by the home gateway device for the end-to-end service based on the amount of bearer service resource requested to be used in the end-to-end service; and if the amount of the core network bearer resource decided by the home policy controlling device and the amount of the visited network bearer resource decided by the visited policy controlling device do not match, performing a process for matching them.

9. The bearer resource controlling method according to claim 8, comprising, in the home policy controlling device, applying a home network policy to the amount of the bearer service resource that is required to be used in the end-to-end service;

sending a resource requesting signal including information on the required amount of the resource to the visited policy controlling device; and deciding the amount of the core network bearer resource to be provided for the end-to-end service in conjunction with the home gateway device; and, in the visited policy controlling device, when the resource requesting signal is received from the home policy controlling device, applying a visited network policy to the information on the requested amount of resource included in the resource requesting signal;

deciding the amount of the visited network bearer resource to be provided for the end-to-end service; and sending an allocation responding signal including the information on the amount of the visited network bearer resource to the home policy controlling device; and, in the home policy controlling device, receiving the responding signal from the visited policy controlling device; and comparing the amount of the core network bearer resource decided by itself and the amount of the visited network bearer resource informed from the visited policy controlling device in the allocation responding signal, and if they do not match, performing a process for matching them.

10. The bearer resource controlling method according to claim 9, wherein, when the home policy controlling device receives a bearer requesting signal for requesting the bearer service resource to be used for the end-to-end service from the mobile terminal, it starts processing for deciding the amount of the core network bearer resource to be provided for the end-to-end service and processing for causing the visited policy controlling device to decide the amount of the visited network bearer resource to be provided for the end-to-end service.

11. The bearer resource controlling method according to claim 9, wherein the home policy controlling device sends the resource requesting signal to the visited policy controlling device, while requesting the resource requested by the mobile terminal from the home gateway device in order to decide the amount of the core network bearer resource to be provided for the end-to-end service;

when the home gateway device is requested for the resource from the home policy controlling device, it responds to the home policy controlling device after determining the amount of the core network bearer resource that can be permitted for the request;

when the visited policy controlling device receives the resource requesting signal from the home policy controlling device, it requests the amount of the resource based on the request of the resource requesting signal from the visited user plane device in order to decide the amount of the visited network bearer resource to be provided for the end-to-end service; and when the visited user plane device is requested for the resource by the visited policy controlling device, it responds to the visited policy controlling device after determining the amount of the visited network bearer resource that can be permitted for the request.

12. The bearer resource controlling method according to claim 11, wherein the visited user plane device comprises the visited user plane controlling device connected with the core network and a base station connected to the visited user plane controlling device and wirelessly connected to the mobile terminal, wherein the visited user plane controlling device manages an access bearer with the base station, and the base station manages a radio bearer with the mobile terminal;

when the visited policy controlling device receives the resource requesting signal from the home policy controlling device, it sends the visited network resource requesting signal for requesting the amount of resource based on the request by the resource requesting signal to the visited user plane controlling device;

when the visited user plane controlling device receives the visited network resource requesting signal, it determines an access bearer resource that can be permitted for the end-to-end service, while sending the wireless resource requesting signal for requesting a radio bearer resource from the base station; and when the base station receives the wireless resource requesting signal, it determines the radio bearer resource that can be permitted to the end-to-end service.

13. The bearer resource controlling method according to claim 12, wherein when the visited user plane controlling device receives the bearer requesting signal for requesting the bearer service resource from the mobile terminal, it determines the access bearer resource that can be permitted for the request by the bearer requesting signal and sends the wireless resource requesting signal for requesting the radio bearer resource from the base station, while sending a core network resource requesting signal for requesting the core network bearer resource to the home gateway device;

when the base station receives the wireless resource requesting signal, it determines the amount of the radio bearer resource that can be permitted for the request by the wireless resource requesting signal and sends the wireless resource allocation responding signal including information on the amount of the radio bearer resource to the visited user plane controlling device;

when the home gateway device receives the core network resource requesting signal, it sends the core network resource allocation responding signal including information on the amount of the core network bearer resource to be allocated for the request by the core network resource requesting signal to the visited user plane controlling device; and if the amount of the radio bearer resource included in the wireless resource allocation responding signal received from the base station and the amount of the core network bearer resource included in the core network resource allocation responding signal received from the home gateway device do not match, the visited user plane controlling device performs processing for matching them.

14. The bearer resource controlling method according to claim 9, wherein the home policy controlling device performs control so as to any bearer resource larger in amount of the core network bearer resource decided by itself and the visited network bearer resource decided by the visited policy controlling device matches to the other smaller in amount.

15. A home policy controlling device in a mobile communication system in which a visited network comprising a visited user plane controlling device and a visited policy controlling device and a home network comprising a home gateway device and a home policy controlling device are connected via a core network, and the visited user plane device connects with a mobile terminal, provides a visited bearer resource for an end-to-end service that goes through the visited network, the core network and the home network between the mobile terminal and a counterpart side device, and relays data of the end-to-end service by the visited network bearer resource, and the home gateway device connects with the mobile terminal via the core network and the visited user plane device in the visited network, provides the core network bearer resource to the end-to-end service, and relays data of the end-to-end service by the core network bearer resource;

wherein the visited policy controlling device is caused to decide the amount of the visited network bearer resource that is provided for the end-to-end service based on the amount of the bearer service resource requested to be used in the end-to-end service, and the home policy controlling device decides by itself the amount of the core network bearer resource that is provided by the home gateway device for the end-to-end service based on the amount of the bearer service resource requested to be used in the end-to-end service; and if the amount of the core network bearer resource decided by itself and the amount of the visited network bearer resource decided by the visited policy controlling device do not match, processing for matching them is performed.

* * * * *